May 12, 1925.
L. SCHÖN
1,537,378
ARRANGEMENT FOR SUPPRESSING SPARKS
Original Filed Sept. 4, 1920
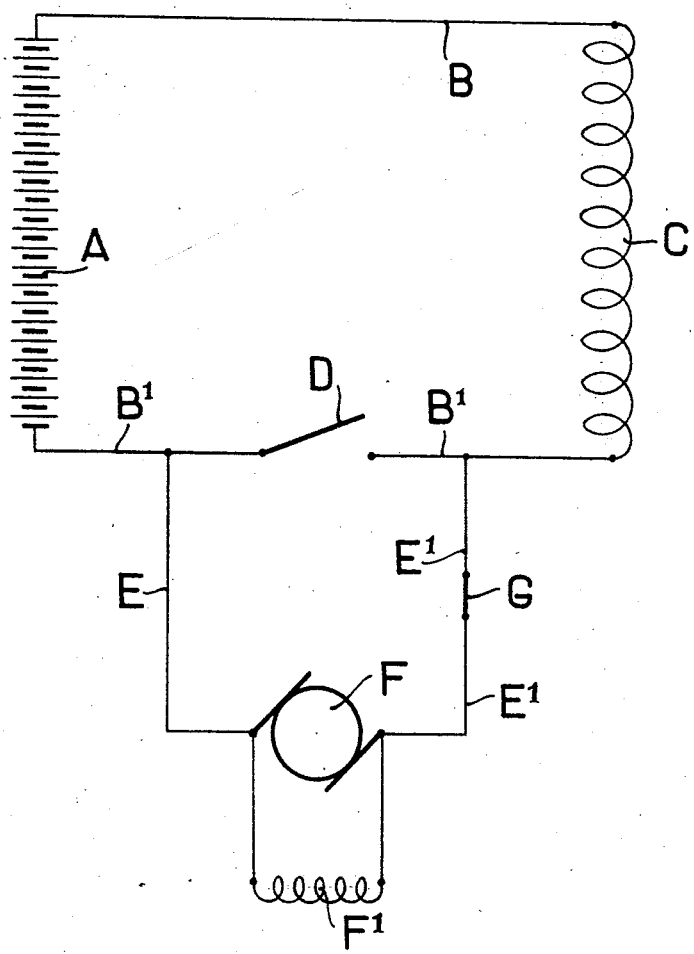

Patented May 12, 1925.

1,537,378

UNITED STATES PATENT OFFICE.

LUDWIG SCHÖN, OF ESSEN, GERMANY.

ARRANGEMENT FOR SUPPRESSING SPARKS.

Original application filed September 4, 1920, Serial No. 408,382. Divided and this application filed May 26, 1921. Serial No. 472,852.

(GRANTED UNDER THE PROVISIONS OF THE ACT OF MARCH 3, 1921, 41 STAT. L., 1313.)

*To all whom it may concern:*

Be it known that I, LUDWIG SCHÖN, residing at Essen, Germany, a citizen of the German Republic, have invented a certain new and useful Improvement in Arrangements for Suppressing Sparks (for which I have filed applications in Germany, filed Oct. 23, 1915; Austria, filed Sept. 6, 1918; and Hungary, filed Sept. 28, 1918), of which the following is a specification.

This invention refers to an arrangement for suppressing the spark produced on breaking a circuit containing a self-inducting element, which is distinguished by its simplicity and reliable action.

This application is a division of my application Serial No. 408382 filed Sept. 4, 1920.

The invention will be described with reference to the accompanying drawing which shows one embodiment of the invention diagrammatically.

A denotes a source of continuous current which is connected by conductors B and $B^1$ to the field winding C having self-induction of a dynamo machine (not shown). In the conductor $B^1$ is placed a circuit breaker D which is intended to enable the current that flows in the field winding C to be broken. Another pair of conductors E and $E^1$ serve to connect in parallel to the circuit breaker D, the armature F of a shunt wound dynamo machine F $F^1$. In order to open the circuit of the dynamo F $F^1$, there is inserted a switch G in the conductor $E^1$.

When the dynamo machine (not shown) is working, the circuit formed by the parts A B C $B^1$ D A is closed and the switch G is closed too. As long as the two switches D and G remain closed, the dynamo F $F^1$ is short-circuited and therefore ineffective. If the switch D be thrown open, the circuit in which the source of current A and the field winding C lie, remains closed across the armature F, and this latter starts. When it does so, it develops as a motor armature a rapidly increasing counter electromotive force, whereby the strength of the current in the circuit A $B^1$ E F $E^1$ G C B A drop in a short time to such a small amount that this circuit can be broken by opening the switch G without an injurious spark being able to develop, such dynamo acting in conjunction with the field winding C acts in the nature of an electrodynamic condenser.

Instead of being shunt wound, the dynamo F $F^1$ may also be extraneously excited.

Claims:

1. In combination with a source of direct current, a load inductance, a switching means in series with said inductance, said switching means comprising a switch and an electrodynamic condensance in shunt with the switch of said switching means.

2. In combination with a source of direct current, a load inductance, a switching means in series with said inductance, said switching means comprising a switch and a dynamo in shunt with the switch of said switching means.

3. In combination with a source of direct current, a load inductance, a switching means in series with said inductance, said switching means comprising a switch and a dynamo in shunt with the switch of said switching means, and means to open circuit said dynamo.

4. In combination with a source of direct current, a load inductance, a switching means in series with said inductance, said switching means comprising a switch and an electrodynamic condensance in shunt with the switch of said switching means, and means to open circuit said dynamo.

5. A circuit arrangement for suppressing sparking when breaking a circuit containing a self-inductive element, comprising a direct current supply connected to the self-inductive element by means of conductors, one of said conductors containing a switch, a circuit containing a continuous current machine connected in parallel to said switch, and a switch inserted in said circuit.

The foregoing specification signed at Essen, Germany, this 4th day of April, 1921.

LUDWIG SCHÖN.